United States Patent
Koivupuro et al.

(10) Patent No.: US 7,593,412 B1
(45) Date of Patent: Sep. 22, 2009

(54) METHOD TO MANAGE SAAL RESOURCES IN DISTRIBUTED IMPLEMENTATION ENVIRONMENT

(75) Inventors: Outi Koivupuro, Helsinki (FI); Ari Hollmen, Helsinki (FI); Hannu Nyrhinen, Vantaa (FI); Sami Röytta, Helsinki (FI); Heikki Kemppainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/168,818

(22) PCT Filed: Dec. 29, 1999

(86) PCT No.: PCT/EP99/10464

§ 371 (c)(1),
(2), (4) Date: Aug. 21, 2002

(87) PCT Pub. No.: WO01/50808

PCT Pub. Date: Jul. 12, 2001

(51) Int. Cl.
*H04L 12/28* (2006.01)
*G01R 31/08* (2006.01)
*H04J 3/16* (2006.01)

(52) U.S. Cl. ............ 370/395.6; 370/216; 370/469

(58) Field of Classification Search ............ 370/468, 370/395.1, 469, 395.6, 400, 395.2, 341, 356, 370/373, 377, 384, 465, 467, 235, 395.65, 370/410, 216, 218, 220, 426
See application file for complete search history.

(56) References Cited

U.S. PATENT DOCUMENTS

| | | | | |
|---|---|---|---|---|
| 5,748,636 A | * | 5/1998 | Gradischnig | 370/395.2 |
| 6,061,364 A | * | 5/2000 | Hager et al. | 370/467 |
| 6,134,238 A | * | 10/2000 | Noh | 370/395.51 |
| 6,154,467 A | * | 11/2000 | Hager et al. | 370/467 |
| 6,418,126 B1 | * | 7/2002 | Gilmurray et al. | 370/310.1 |
| 6,424,629 B1 | * | 7/2002 | Rubino et al. | 370/241.1 |
| 6,563,794 B1 | * | 5/2003 | Takashima et al. | 370/236 |
| 6,665,264 B1 | * | 12/2003 | Davison et al. | 370/230 |
| 6,714,516 B1 | * | 3/2004 | Todd | 370/235 |
| 6,993,030 B2 | * | 1/2006 | Caves et al. | 370/395.3 |

FOREIGN PATENT DOCUMENTS

WO  WO 98/57519  12/1998

OTHER PUBLICATIONS

"B-ISDN Signalling ATM Adaptation Layer (SAAL)—Layer Management for the SAAL at the Network Node Interface (NNI)," ITU-T Recommendation, Nov. 17, 1995, XP002146489.

* cited by examiner

*Primary Examiner*—Hanh Nguyen
(74) *Attorney, Agent, or Firm*—Harrington & Smith, PC

(57) ABSTRACT

The invention proposes a method for managing of Signalling ATM Adaptation Layer (SAAL) resources performed in a sublayer comprising the steps of receiving a request from a Layer Management (LM); processing the request in the sublayer; judging whether the processing of the request has been successful, and forwarding a success message to the Layer Management (LM) in case the processing has been successful, or forwarding a failure message to the Layer Management (LM) in case the processing has not been successful. By this method it is guaranteed that the SAAL resources are available as long as the corresponding signalling link/channel is configured in a network element. It further enables detection of SAAL resource defects.

16 Claims, 5 Drawing Sheets

METHOD TO MANAGE SAAL RESOURCES IN DISTRIBUTED IMPLEMENTATION ENVIRONMENT

PRIORITY CLAIM

This is a national stage of PCT application No. PCT/EP99/10464, filed on Dec. 29, 1999. Priority is claimed on that application.

FIELD OF THE INVENTION

The present invention relates to a method and a device for managing of Signalling ATM Adaptation Layer (SAAL) resources.

BACKGROUND OF THE INVENTION

The present invention relates to the so-called Signaling ATM Adaptation Layer (SAAL) which is defined in the ITU-T Q.2100. In the following, the main function of the SAAL and the layers related thereto are described in short.

FIG. 1 illustrates the placement of the SAAL in broadband signalling stacks (protocol stacks) for User-Network-Interface (UNI) and Network-Node-Interface (NNI) operations. For the UNI, Q.2931 (ITU-T specification, Q.2931 is a variation of ISDN layer 3 Q.931) is used to set up and tear down a connection. It operates over the Signalling ATM Adaptation Layer (SAAL) which is designed especially for Q.2931. These layers operate over the conventional ATM (Asynchronous Transfer Mode) layer and a selected physical layer (indicated by PHY in FIG. 1). For the NNI, the broadband ISUP (B-ISDN) and Message Transfer Part 3 (MTP3) are variations of their counterparts in the SS7 signalling standard. The SAAL supports their operations. These layers also operate over the conventional ATM layer and a selected physical layer.

The SAAL serves to provide a correct transfer of signalling data on a broadband signalling link. It relieves the user of concerning about data errors, duplicates, or insertions that may occur on the signalling link.

SAAL provides a link monitoring service, and checks whether links are stable and error-free enough to be used. It can also take a link out of service if it becomes unreliable. SAAL also provides for flow control procedures and employs a mechanism to insure that two exchanges do not create congestion problems.

The SAAL comprises two protocol entities, a Service Specific Coordination Function (SSCF) and a Service Specific Connection Oriented Protocol (SSCOP) which contribute to the overall functions of the SAAL. These overall operations are coordinated by a Layer Management (LM).

The SSCF maps primitives received from the MTP3 layer to the required SSCOP signals and vice versa. That is, it transfers signals the SSCOP and the MTP 3 or Q.2931 layer. Moreover, SSCF is responsible for the flow control. That is, it notifies the user about levels of congestion in order to prevent a cell loss. It also regulates its flow of Protocol Data Units (PDUs) to the lower layers to prevent congestion at the other end. Furthermore, SSCF is responsible for the link status. Based on primitives it receives from MTP3 and SSCOP, the SSCF maintains information (local state variables) about the status of the link, such as information indicating that the link is aligned ready or that it is out of service and so on. Using this information, it may generate primitives/signals to MTP3 and SSCOP to aid in managing the link. In addition, the SSCF reports to the Layer Management (LM) when a link is released. It relies upon LM to help in the error monitoring function. Finally, SSCF maintains the information (state variables) about all the alignment procedures that are taking place when a link is brought into service or taken out of service.

On the other hand, the SSCOP performs sequencing and acknowledgement of traffic, for example. That is, keeps all signalling units (messages) that flow across the link in sequential order, and it also provides for retransmission of defective traffic. To make certain the exchanges (communication nodes) are operational, each node executes a so-called "keep alive" procedure with its neighbour exchange. SSCOP also contains a procedure that allows the local user to look at the SSCOP queue for purposes of determining the status of messages. The SSCOP also provides a number of status reporting operations.

The SSCOP interacts with a further sublayer, the so-called Common Part AAL Protocol (CP-AAL) or AAL5CP (ATM Adaptation Layer type 5 Common Part). The CP-AAL performs further AAL functions not contained in the SSCF and SSCOP layers.

The Layer Management (LM), which is defined in ITU-T Q.2144, interacts with the layers to perform a variety of operations, administration and maintenance (OAM) functions. LM determines if a signalling link should be taken out of service or put into service (the latter function is called link proving). As part of these operations, links are monitored for excessive delays in the delivery of traffic. LM also permits a certain number of errors to occur on the link in order to avoid unnecessary changeovers to alternate links. Furthermore, a number of ongoing measurements are taken by the LM. For example, counters are maintained on how long each link has been in service, how often it has failed, how often and how many times the link has experienced congestion, and other information.

The Layer Management is originally described only for the SAAL at NNI, and, as described above, the main function of it is the error monitoring and quality measurement production of NNI SAAL.

Upon initialisation of a signalling link/channel using SAAL, for each of the above-described sublayers resources have to be provided. That is, when a signalling link/channel using SAAL is configured in the network element, dedicated SAAL resources have to be provided. The SAAL resources comprise an SSCOP resource, an SSCF resource and a CP-AAL (AAL5CP) resource.

The provision and management of resources are in particular important in case the SAAL stack is implemented in a distributed implementation environment.

However, according to the prior art such a provision is not described.

SUMMARY OF THE INVENTION

Hence, it is an object of the present invention to describe a method for managing SAAL resources.

In particular the invention proposes a method for managing of Signalling ATM Adaptation Layer (SAAL) resources performed in a sublayer comprising the steps of receiving a request from a Layer Management (LM), processing the request in the sublayer, judging whether the processing of the request has been successful, and sending a success message to the Layer Management in case the processing has been successful, or sending a failure message to the Layer Management in case the processing has not been successful.

Alternatively, the above object is achieved by a sublayer managing device.

In particular, the sublayer managing device for managing of Signalling ATM Adaptation Layer (SAAL) resources comprises a first receiving means for receiving a request from a Layer Management, a processing means for processing the request, a judging means for judging whether the processing of the request has been successful, and a first sending means for sending a message indicating the result of the judging means to the Layer Management.

By the above method and device, a enables a SAAL resource process (e.g., a resource reservation) for a signalling link/channel when the signalling link/channel is configured in a corresponding network element. Similarly, this method enables the SAAL resource removal when a corresponding signalling link/channel is removed from the configuration of the network element.

The method according to the invention guarantees that the SAAL resources are available as long as the corresponding signalling link/channel is configured in the network element.

The method ensures that SAAL resource defects are detected and no other SAAL resources remain reserved and the SAAL entity can be recovered.

In addition, this method guarantees that the AAL-out_of_service primitive is sent to the NNI SAAL user layer (for example MTP3), although the NNI SAAL is defect. Namely, according to the prior art, if the failure is in the SSCF-NNI layer of the SAAL stack, it was not able to send the AAL_out_of_service primitive (as specified in Q.2140). This method ensures that the AAL_out_of_service primitive is sent to the NNI SAAL user also if the SSCF-NNI layer is defect.

Further advantageous developments are set out in the dependent claims.

In particular, the request can be sent to a lower sublayer immediately after the request has been received.

Alternatively, the request can be sent to a lower sublayer in case the processing has been successful.

Furthermore, a failure message can be sent to the upper sublayer upon receiving a failure message from the lower sublayer.

Moreover, the processing can be prohibited upon receiving a failure message from the lower layer. Thus, in case the management request is a resource reservation request, in case of a failure of the lower sublayer no resources are reserved and occupied.

In addition, all resources in all layers can be initialized upon receiving a failure message by the highest layer, for example, the Layer Management (LM). Namely, if some of the SAAL resources are defect, the SAAL stack is confused and the signalling link/channel corresponding to this SAAL entity is not able to transfer signalling messages. In this situation, the remaining resources have to be removed or brought back to an initial state in order to recover the SAAL entity.

The method and device can preferably be applied to a SAAL stack comprising a Layer Management, a Service Specific Coordination Function (SSCF) layer, a Service Specific Connection Oriented Protocol (SSCOP) layer and a Common Part Adaptation ATM Layer (CP-AAL).

The request can be a request for resource reservation, a request for resource removal, a request for resource supervision or the like.

The sublayer device can also comprise a second sending means for sending the request to a lower sublayer. Moreover, the sublayer device can comprise a second receiving means for receiving messages from the lower sublayer.

The invention also proposes a Layer Management device for managing SAAL sublayers according to claim 18 by using at least one sublayer management device mentioned above. The Layer Management device comprises a receiving means for receiving messages from the sublayer management device, and an initializing means for initializing the sublayer management device in case the receiving means receives a failure message.

By this measure, the Layer Management can quickly restore the initial SAAL state.

BRIEF DESCRIPTION OF THE DRAWINGS

The present invention will be more readily understood with reference to the accompanying drawings in which.

DETAILED DESCRIPTION OF PREFERRED EMBODIMENT

In the following, a preferred embodiment of the invention is described in more detail with reference to the accompanying drawings.

Figure 1:
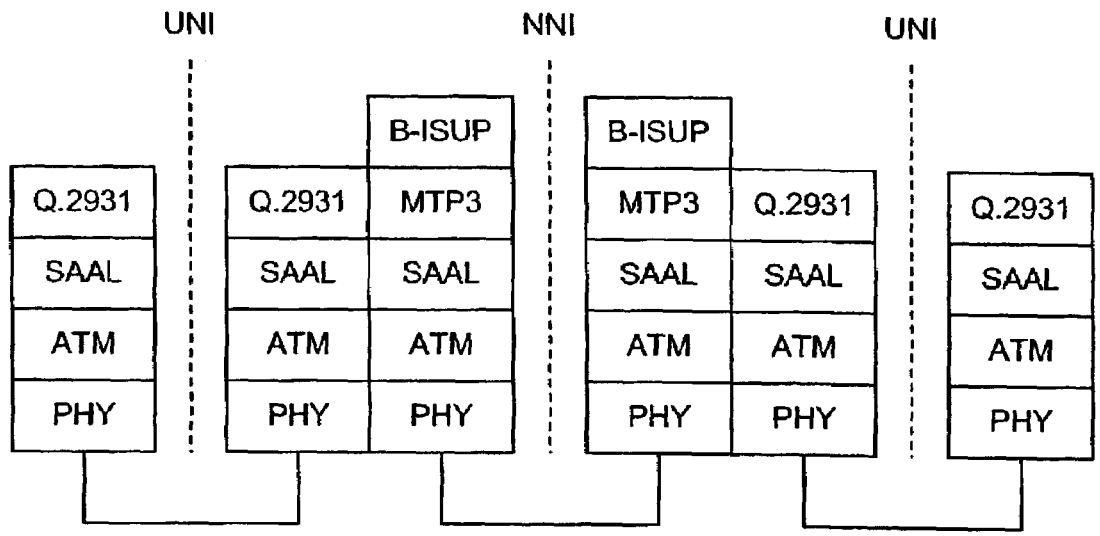
FIG. 1 shows broadband signalling stacks and SAAL.
Figure 2:
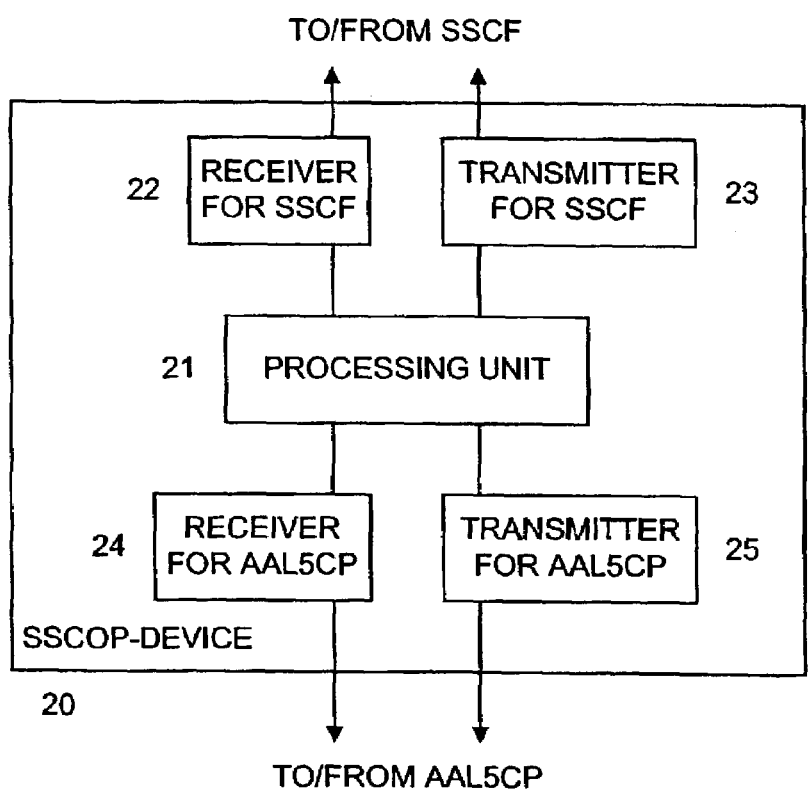
FIG. 2 shows a device providing SSCOP function according to a preferred embodiment.

FIG. 2 shows means of a device implementing the SSCOP function, which are important for the embodiment. It is noted that each of the layers SSCF, SSCOP and CP-AAL (AAL5CP) comprise such a device for implementing the method according to the embodiment. However, it is noted that the lowest layer, i.e., CP-AAL, does not need a receiver and a transmitter for communication with a lower layer.

Reference numeral 21 denotes a processing unit in which several processes such as reserving resources in the particular sublayer (i.e., the SSCF sublayer) for a signalling link/channel, removing resources and supervising of resources are processed. Reference numeral 22 denotes a receiver for SSCF which is adapted to receive messages from the upper layer (in this case, the SSCF layer). Reference numeral 23 denotes a transmitter for SSCF which is adapted to send messages to the upper layer (SSCF layer). Reference numeral 24 denotes a receiver for AAL5CP which is adapted to receive messages from the lower layer (in this case, AAL5CP or CP-AAL).

Reference numeral 25 denotes a transmitter for AAL5 Cp which is adapted to send messages to the lower layer.

Figure 3:
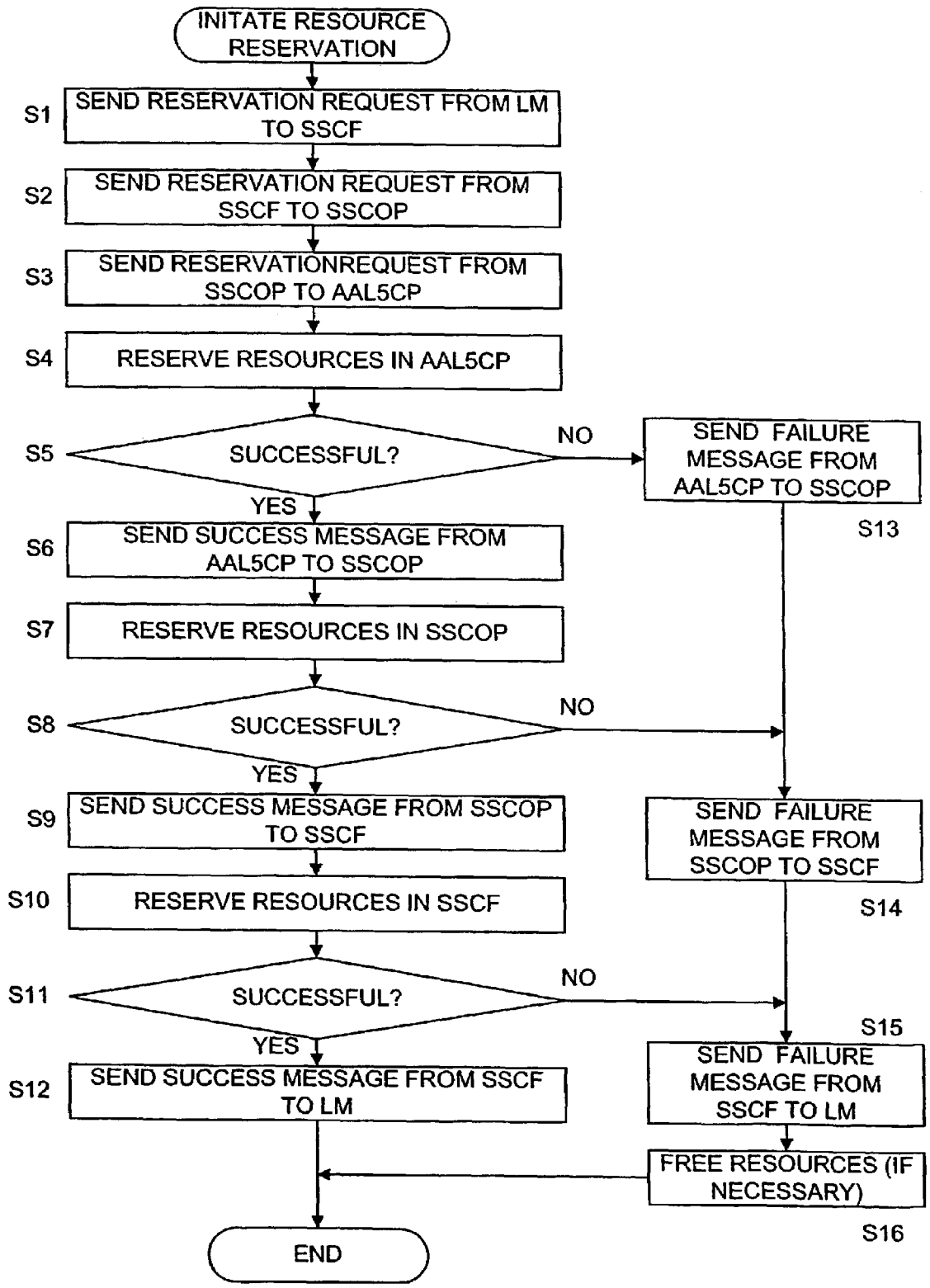
FIG. 3 shows a flowchart illustrating a process according to the preferred embodiment.

FIG. 3 shows a flowchart representing a management routine according to the present embodiment.

As an example for the resource management, here, a resource reservation is selected. Other examples can be a resource removal or resource supervision which are basically managed in the same way.

The process is started when a resource reservation is requested, for example, in case a signalling channel is initiated.

In step S1, the LM entity sends the corresponding reservation request to the first SAAL sublayer, i.e., the SSCF layer. In step S2, this request is forwarded to the next layer, i.e., the SSCOP layer. In step S3, the request is forwarded to the lowest SAAL sublayer, i.e., the AAL5CP (AAL5 Common Part) layer or CP-AAL (Common Part Adaptation ATM Layer).

In step S4, the requested process, i.e., the resource reservation, is performed in the AAL5CP sublayer. That is, a resource for a signalling link/channel is reserved.

In step S5 it is judged whether the processing of the request, i.e., the resource reservation, has been successful.

If the processing has not been successful, a failure message is sent to the upper sublayer, i.e. the SSCOP sublayer in step S13. Then, the routine advances to step S14 in which in response to the failure message sent in step S13 a failure message is sent to the SSCF sublayer. Thereafter, the routine advances to step S15 in which a failure message is sent to the Layer Management (LM). Thus, if the lowest sublayer fails, the upper sublayers are bypassed and no processes (e.g., reservations of resources) are performed therein.

Optionally, the Layer Management can issue a initialization command such that the resources are brought back into an initial state in order to recover the SAAL entity. In this example of resource reservation, resources which has been reserved are freed again.

If, on the other hand, the processing in step S4 has been judged in step S5 as successful, a success message is sent to the upper sublayer, i.e., the SSCOP sublayer in step S6.

The steps S7 to S9 correspond to the steps S2 to S4 performed in the AAL5CP layer. That is, in step S7, the resources are tried to be reserved in the SSCOP layer and in step S8 it is judged whether the reservation has been successful. If it has not been successful, the routine advances to the step S14 mentioned above. Thus, in this way a failure message is sent via step S15 to the Layer Management (LM). If, on the other hand, the processing of step S7 has been successful, a success message is sent to the SSCF layer in step S9.

The subsequent steps S10 to S12 also correspond to the steps S2 to S4 performed in the AAL5CP layer. That is, in step S10, the reservation of resources is performed. Correspondingly to the steps S8 and S5 described above, it is judged in step S11 whether the reservation has been successful. In case it has not been successful, the routine advances to step S15 mentioned above, in which a failure message is sent to the Layer Management (LM).

If, on the other hand, the processing has been successful, a success message is sent to the Layer Management in step S12. Then the routine ends, and the Layer Management can correspondingly take actions. In this example, in which the request has been a request for reserving resources, the Layer Management can enable a signalling link/channel to be used. In an other example, in case the request has been a request for removing resources, the Layer Management can release the signalling link/channel which has occupied the resources.

In the following, some examples of resource management are described with respect to FIGS. 4 to 8. It is noted that the configuration of the SAAL shown in these figures applies for both an SAAL at a Network Node Interface (NNI) and an SAAL at a User Network Interface (UNI), although in particular the structure of the SSCF is different for NNI and UNI. Thus, in order to simplify the description, it is not distinguished between UNI and NNI in the following. However, it is noted that it is an important feature of the embodiment that the routine according to the embodiment can be applied to both UNI and NNI.

Figure 4:
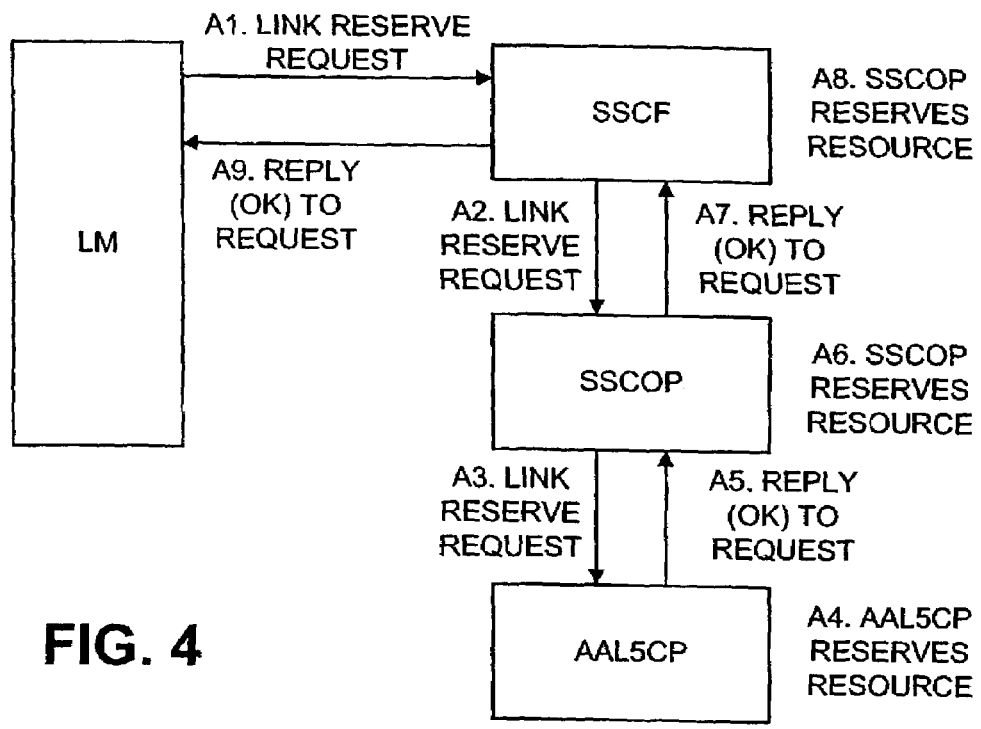
FIG. 4 illustrates an example for an SAAL resource reservation for a signalling link, successful case.

FIG. 4 shows an example for an SAAL resource reservation for a signalling link in a successful case. A1 indicates that a link reserve request is issued from the Layer Management to the SSCF sublayer. The link request is then forwarded to the SSCOP layer (A2) and to the AAL5CP layer (A3). Thereafter, the AAL5CP layer reserves the necessary resource for the signalling link (A4). In response to the successful reservation, a reply, i.e., a success message is sent to the SSCOP layer (A5). Upon receiving the success message, the SSCOP reserves a resource for the signalling link (A6). After successfully reserving the resource, a success message (OK) is sent to the SSCF layer (A7) where accordingly the SSCOP reserves a resource for the signalling link (A8). In case of success, the SSCF sends a success message to the Layer Management (LM) (A9).

Figure 5:
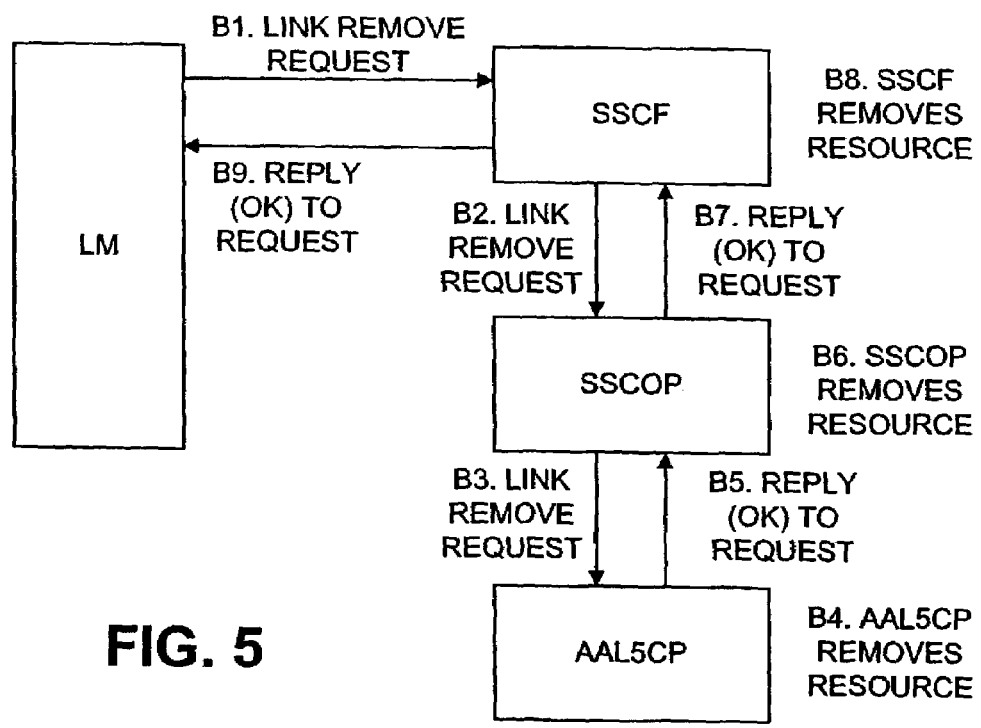
FIG. 5 illustrates an example for an SAAL resource removal for a signalling link, successful case.

FIG. 5 shows an example for an SAAL resource removal for a signalling link in a successful case. B1 indicates that a link removal request is issued from the Layer Management to the SSCF sublayer. The request for removing the resources is then forwarded to the SSCOP layer (B2) and to the AAL5CP layer (B3). Thereafter, the AAL5CP layer removes the corresponding resource for the signalling link from the AAL5CP layer (B4). In response to the successful removal of the resource, a reply, i.e., a success message is sent to the SSCOP layer (B5). Upon receiving the success message, the SSCOP removes the reserved resource for the signalling link (B6). After successfully removing the resource, a success message (OK) is sent to the SSCF layer (B7). As a result, the SSCF removes a resource for the signalling link from the SSCF sublayer (B8). In case of success, the SSCF sends a success message to the Layer Management (LM) (B9).

Hence, in the examples according to FIGS. 4 and 5, the steps S1 to S12 are sequentially performed, all judging steps being positive.

Figure 6:
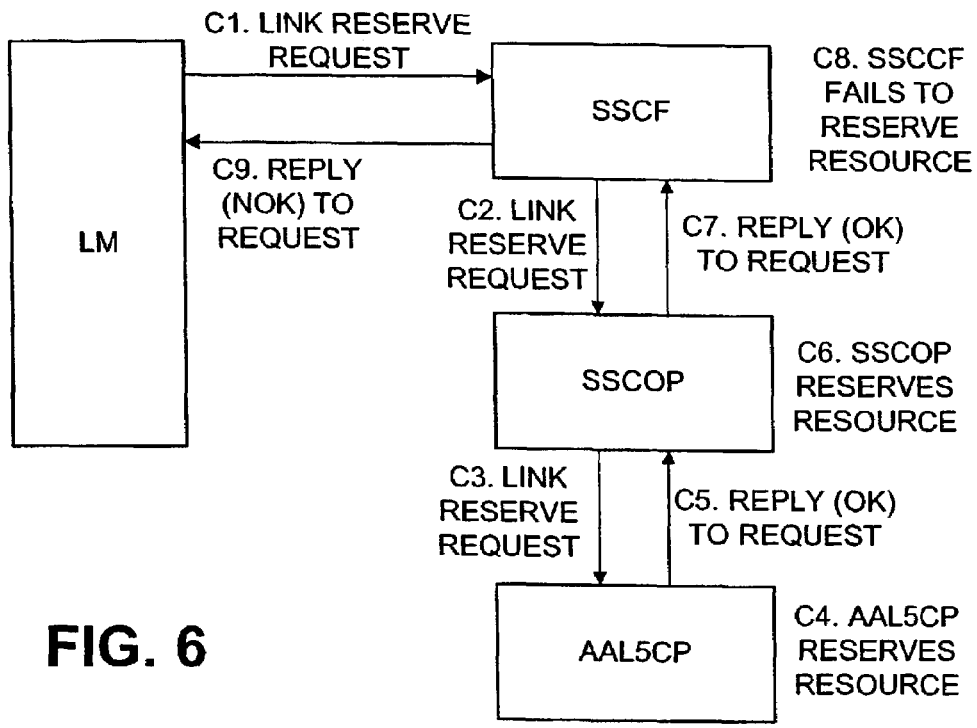
FIG. 6 illustrates an example for an SAAL resource reservation for a signalling link, unsuccessful case, SSCF fails.

FIG. 6 shows an example of an unsuccessful case of a SAAL resource reservation. In detail, the SSCF (for example, at NNI) fails.

First, a link reserve request is issued by the Layer Management to the SSCF layer (C1). The link request is then forwarded to the SSCOP layer (C2) and to the AAL5CP layer (C3). Thereafter, the AAL5CP layer reserves the necessary resource for the signalling link (C4). In response to the successful reservation, a reply, i.e., a success message is sent to the SSCOP layer (C5). Upon receiving the success message, the SSCOP reserves a resource for the signalling link (C6). After successfully reserving the resource, a success message (OK) is sent to the SSCF layer (C7) where accordingly the SSCF tries to reserve a resource, but fails (C8). Hence, a failure message, (reply: NOK) is sent to the Layer Management (C9). Thus, the Layer Management can now perform initialisations or the like in order to recover the SAAL entity.

According to an alternative implementation of the present invention, resource reservation may be done in the respective layers immediately after the request message has been received. In this case the request message is not necessarily forwarded to the lower layers in case of an error.

Figure 7:
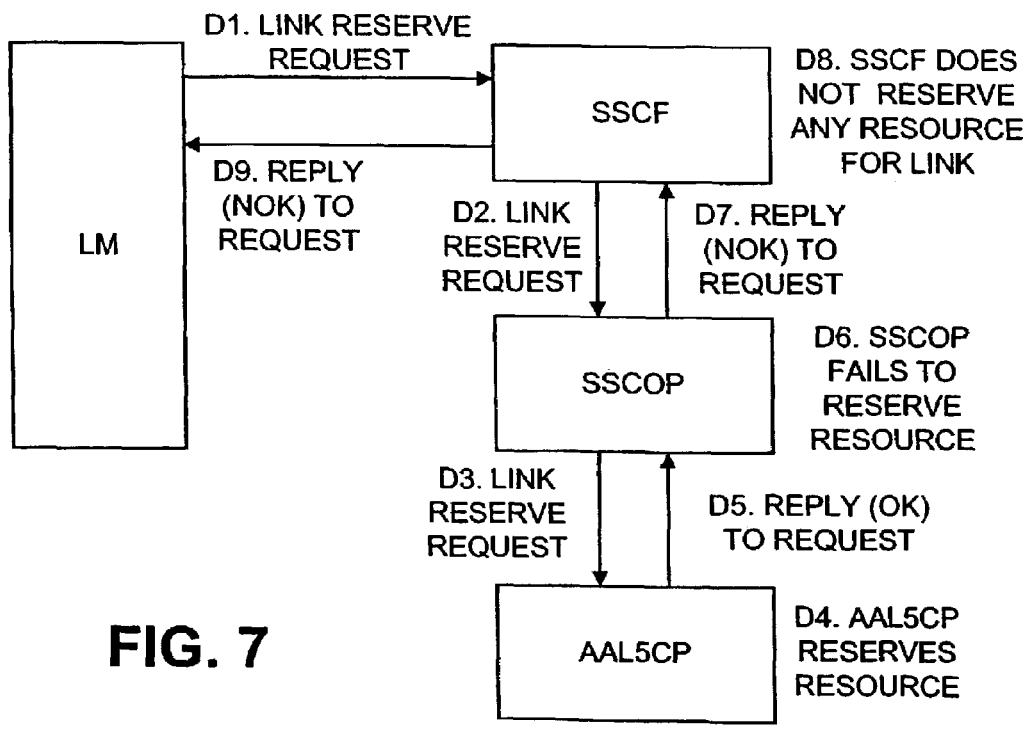
FIG. 7 illustrates an example for an SAAL resource reservation for an signalling link, unsuccessful case, SSCOP fails.

FIG. 7 illustrates a further example in which the SAAL resource reservation has been unsuccessful. Here, the SSCOP sublayer fails.

Similar to FIG. 6, a link reserve request is issued to the SSCF layer (D1) and thereafter to the SSCOP layer (D2) and to the AAL5CP layer (D3). Thereafter, the AAL5CP layer reserves the necessary resource for the signalling link (D4). In response to the successful reservation, a reply, i.e., a success message is sent to the SSCOP layer (D5). However, the SSCOP layer fails to reserve a resource (D6), and a corresponding failure message is sent to the SSCF layer (D7). As a result, the SSCF layer does not reserve any resource (D8) and sends a failure message to the Layer Management (D9).

Figure 8:
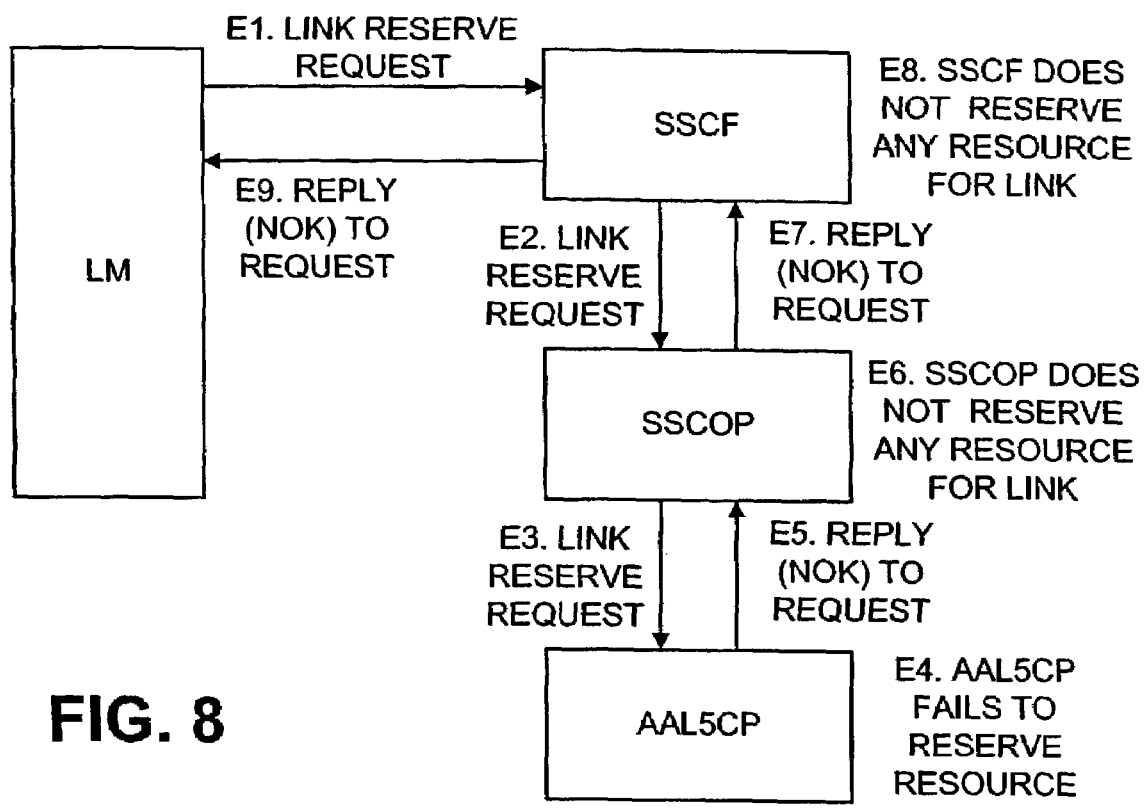
FIG. 8 illustrates an example for an SAAL resource reservation for a signalling link, unsuccessful case, AAL5CP fails.

FIG. 8 illustrates an example in which the AAL5CP layer fails during the SAAL resource reservation for a signalling link.

As in FIG. 4, the link reserve request is forwarded up to the AAL5CP layer (E1 to E3). The AAL5CP layer tries to reserve a resource for the signalling link, but fails (E4). As a result, it sends a reply (NOK), i.e., a failure message to the SSCOP layer (E5). Hence, the SSCOP layer does not reserve any resources (E6) and sends a failure message to the SSCF layer (E7). Similar, the SSCF layer does not reserve any resources for the signalling link (E8) and sends a failure message to the Layer Management (E9).

The above description and accompanying drawings only illustrate the present invention by way of example. Thus, the embodiment of the invention and the modifications thereof described above may vary within the scope of the attached claims.

What is claimed is:

1. A method, comprising:
   receiving a request from a layer management of a network element, the request being a request for resource reservation or a request for resource removal or a request for resource supervision;
   processing said request in a sublayer of an asynchronous transfer mode adaptation layer of the network element;
   judging whether the processing of said request has been successful;
   sending a success message to said layer management when it is judged that the processing has been successful; and
   sending a failure message to said layer management when it is judged that the processing has not been successful.

2. The method of claim 1, further comprising:
   sending said request to a lower sublayer immediately after receiving said request.

3. The method of claim 2, further comprising:
   initializing all resources in all layers upon receiving a failure message by a highest layer.

4. The method of claim 1, further comprising:
   sending said request to a lower sublayer if the processing has been successful.

5. The method of claim 1, further comprising:
   sending a failure message to said layer management upon receiving a failure message from a lower layer.

6. The method of claim 1, further comprising:
   prohibiting said processing upon receiving a failure message from a lower layer, and
   allowing said processing upon receiving a success message from the lower layer.

7. The method of claim 1, wherein said method is applied to a signaling asynchronous transfer mode adaptation layer stack comprising said layer management, a service specific coordination function layer, a service specific connection oriented protocol layer and a common part adaptation asynchronous transfer mode layer.

8. An apparatus, comprising:
   a sublayer manager configured to manage resources of a signaling asynchronous transfer mode adaptation layer of a network element;
   a first receiver configured to receive a request from a layer management of the network element, the request being a request for resource reservation or a request for resource removal or a request for resource supervision;
   a processor configured to process said request;
   a judger configured to judge whether the processing of said request has been successful; and
   a first sender configured to send a message indicating a result of said judger to said layer management.

9. The apparatus of claim 8, further comprising:
   a second sender configured to send said request to a lower sublayer,
   wherein said second sender is configured to send said request immediately after said first receiver has received said request.

10. The apparatus of claim 8, further comprising:
    a second sender configured to send said request to a lower sublayer,
    wherein said second sender is configured to send said request when the processing of said request has been successful.

11. The apparatus of claim 8, further comprising:
    a second receiver configured to receive messages from a lower sublayer,
    wherein said first sender is configured to send a failure message to said layer management if said second receiver receives a failure message from said lower sublayer.

12. The apparatus of claim 8, further comprising:
    a second receiver configured to receive messages from a lower sublayer,
    wherein said processor is configured to prohibit processing if said second receiver receives a failure message from said lower sublayer and to allow processing if said second receiver receives a success message from said lower sublayer.

13. The apparatus of claim 8, wherein said is included in a system representing a signaling asynchronous transfer mode adaptation layer stack comprising said layer management, a service specific coordination function layer, a service specific connection oriented protocol layer and a common part adaptation asynchronous transfer mode layer.

14. A system, comprising:
    a sublayer manager configured to manage resources of a signaling asynchronous transfer mode adaptation layer of a network element;
    a first receiver configured to receive a request from a layer management of the network element, the request being a request for resource reservation or a request for resource removal or a request for resource supervision;
    a processor configured to process said request;
    a judger configured to judge whether the processing of said request has been successful;
    a first sender configured to send a message indicating a result of said judger to said layer management;
    a second receiver configured to receive messages from said sublayer manager; and
    an initiator configured to initialize said sublayer manager when said second receiver receives a failure message.

15. An apparatus, comprising:
    managing means for managing resources of a signaling asynchronous transfer mode adaptation layer of a network element;
    receiving means for receiving a request from a layer management of the network element, the request being a request for resource reservation or a request for resource removal or a request for resource supervision;
    processing means for processing said request;
    judging means for judging whether the processing of said request has been successful; and
    sending means for sending a message indicating a result of said judging means to said layer management.

16. A computer readable medium configured to store instructions of a computer program that when executed by a processor that performs:

receiving a request from a layer management of a network element, the request being a request for resource reservation or a request for resource removal or a request for resource supervision;

processing said request in a sublayer of an asynchronous transfer mode adaptation layer of the network element;

judging whether the processing of said request has been successful;

sending a success message to said layer management when it is judged that the processing has been successful; and sending a failure message to said layer management when it is judged that the processing has not been successful.

* * * * *